Mar. 6, 1923. 1,447,650.
L. EGGER.
MACHINE FOR CUTTING EMBROIDERY.
FILED MAR. 25, 1920. 3 SHEETS—SHEET 1.

Inventor:
Louis Egger.

Mar. 6, 1923.
L. EGGER.
MACHINE FOR CUTTING EMBROIDERY.
FILED MAR. 25, 1920.

1,447,650.

3 SHEETS—SHEET 2.

Inventor.
Louis Egger,
Atty.

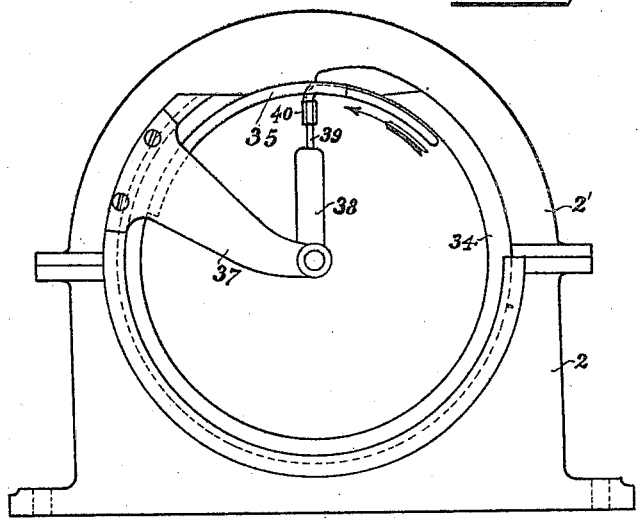
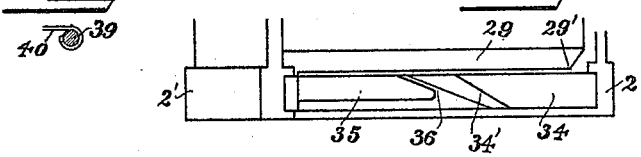
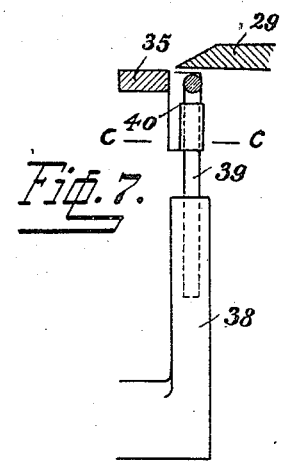
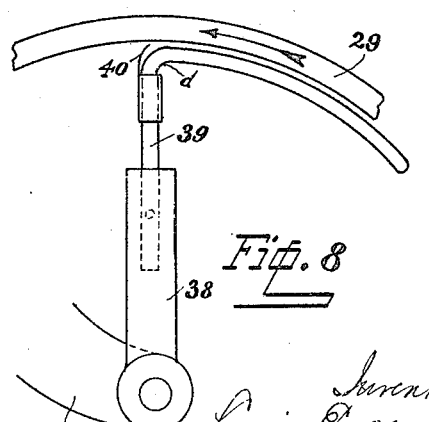

Patented Mar. 6, 1923.

1,447,650

UNITED STATES PATENT OFFICE.

LOUIS EGGER, OF SUMISWALD-GRUNEN, SWITZERLAND.

MACHINE FOR CUTTING EMBROIDERY.

Application filed March 25, 1920. Serial No. 368,564.

*To all whom it may concern:*

Be it known that I, LOUIS EGGER, a citizen of the Swiss Confederation, and residing at Sumiswald-Grunen, Switzerland, have invented certain new and useful Improvements in Machines for Cutting Embroidery, of which the following is a specification.

The present invention has reference to certain new and useful improvements in machines for cutting embroidery, and it relates more particulary to a machine with a revoluble circular or tubular cutter a counter-piece for such cutter and rollers for the fabric, the member carrying the revoluble ring shaped cutter comprising a ring forming the ball-race of a ball bearing, the cooperating ring of which being lodged in a two part casing, one part of which is provided with means in connection with said ring cutter, said counter-piece and said feed rollers for controlling the cutting operation, an arrangement which guarantees a large output of work and effectively protects fabric and embroidery from injury.

Figure 1:
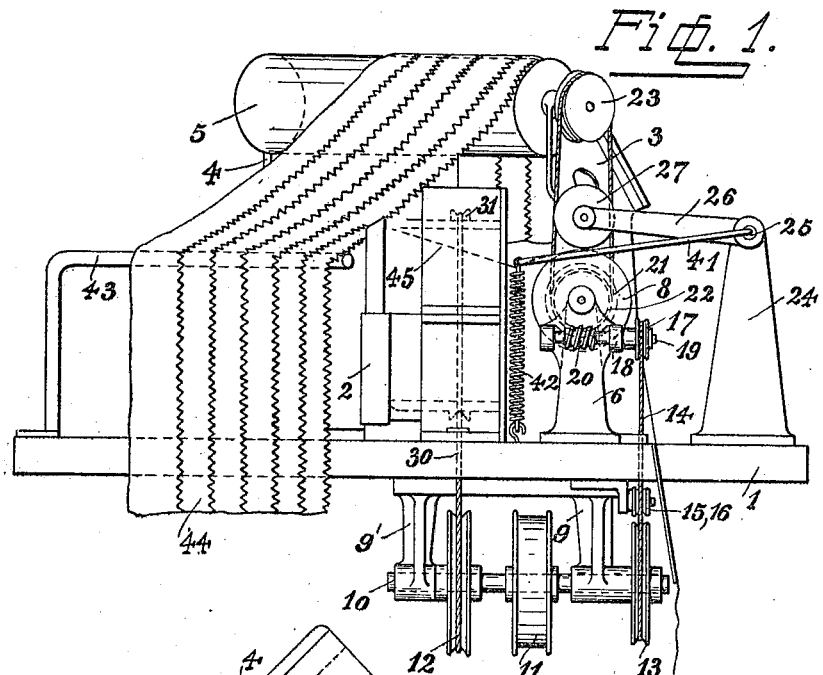
Figure 2:
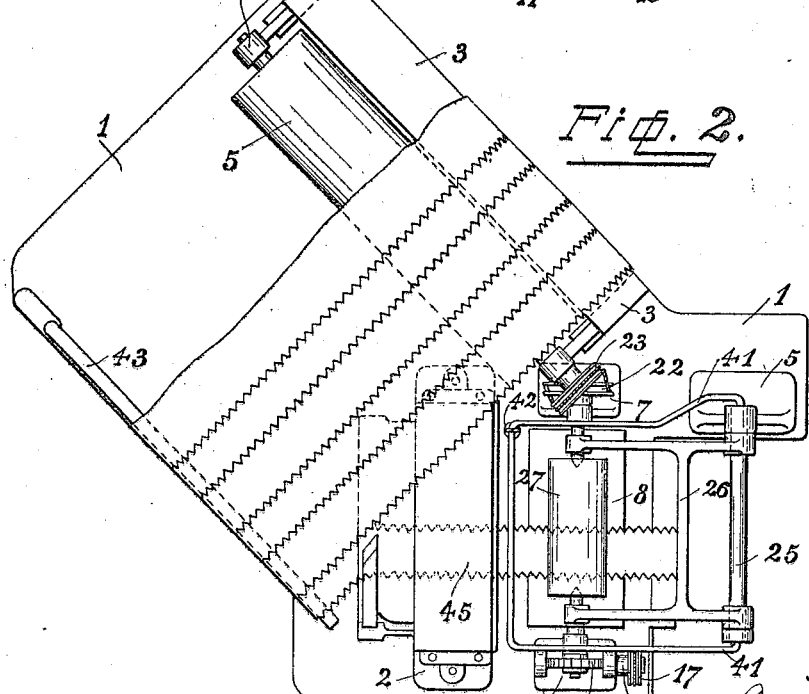
Figure 3:
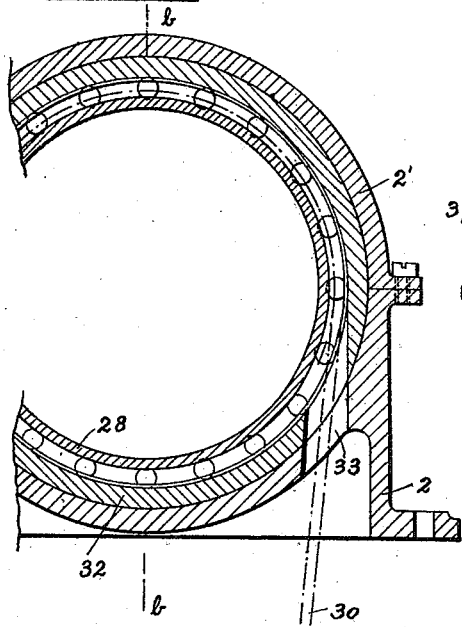
Figure 4:
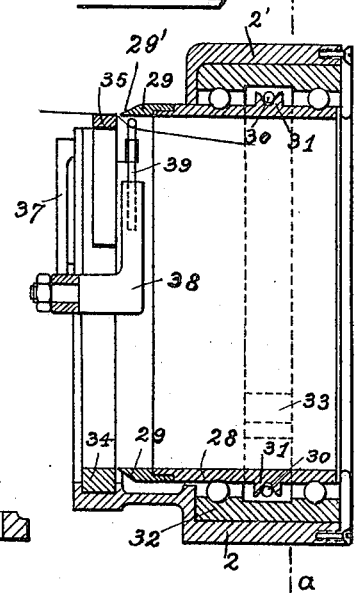
Figure 5:
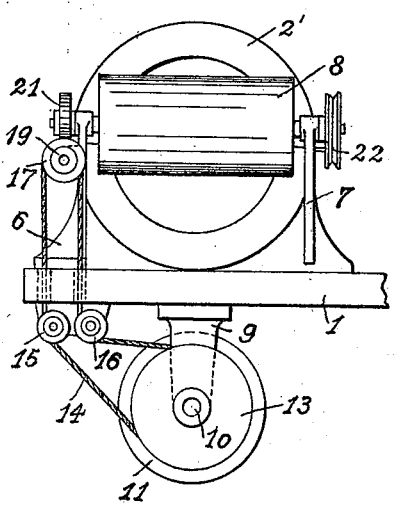
Figure 6:
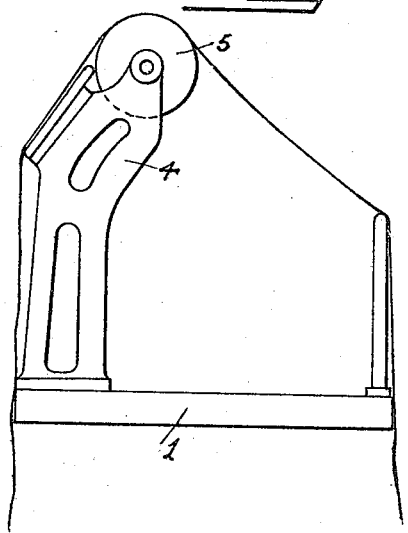

My invention will best be understood when described in connection with the accompanying drawings, in which Fig. 1 is a partly front elevation Fig. 2 a top view of the same, Fig. 3 a section of the casing, lodging the cutter according to line $a$—$a$ of Fig. 4, Fig. 4 a section of the casing according to the line $b$—$b$ of Fig. 3, Figs. 5, 6, 7 and 8 show details, Fig. 9 is a section of a detail, Fig. 10 is a front view of the casing and Fig. 11 a top view of the same.

From the bed-plate 1 rises a two-part casing 2, 2' enclosing a ball bearing and in brackets 3, 4 is journaled a roller 5 and in brackets 6 and 7 a roller 8. Fastened to the bottom of the plate 1 are brackets 9, 9' in which is journaled a shaft 10 carrying a driving pulley 11 and grooved wheels 12, 13. By a rope 14 guided by guide rollers 15 and 16 (Figs. 1 and 5) a grooved wheel 17 is driven, placed on a shaft 19 journaled in bracket 18, which shaft 19 carries a worm 20, driving by means of the wormwheel 21 the roller 8, whilst the roller 5 is driven by the grooved wheels 22 and 23, sitting on the shaft of the roller 8.

On the bed-plate 1 a bracket 24 is fastened, in which is journaled a shaft 25, carrying a swinging lever 26 on which is mounted a roller 27 preferably made of yielding material such as rubber, or the like, resting upon the roller 8.

In the two part casing 2, 2' (Figs. 3 and 4) a ball bearing is disposed, whose ball-race 28 carries a cutter 29 with an edge 29'. About in the middle of the ball-race 28 a driving pulley in the form of a grooved wheel 31 is arranged, for a driving rope 30. The outer, fast ring 32 of the ball race is provided with openings 33, 33 through which passes the driving rope 30 from the grooved wheel 12 to the wheel 31. In the casing 2, 2' is a segment 34 having an oblique slot 34' through one of its upper ends (Fig. 11). On the inner side of the segment 34 part of another segment is fastened serving as a counter-piece 35 to the cutter 29, the counter 35 is of such form, and fastened in such a manner as to form an opening or space 36 located at a suitable distance from the slot 34' and the other beveled end of the segment 34. The length of the space 36 and the distance of the counter-piece 35 from the cutter are so dimensioned, as to allow the fabric to pass between them, whilst the embroidered part, a festoon for instance, will abut against the said parts.

The upper part 2' of the casing 2, 2' carries a bracket 37 (Figs. 8 and 10) its upstanding arm 38, serving as a holder for a stop 39. This stop is to prevent the fringing of the fabric, and at the bend $d$ is a guide 40 in the form of a vane (Figs. 7 to 10) which is placed and maintained to lie in the angle formed by the cutter 29 and the counter-piece 35. The guide 40 has the form of a pipe clip and is fastened onto the stop 39. 41 is a bail serving as a spanning means journaled oscillatingly in the ends of the shaft 25 and influenced by a spring 42 (Figs. 1 and 2). The bed plate 1 is also provided with an arm 43 which is parallel to the roller 5, the same serving as a guide to the fabric during the cutting.

If now of the work piece 44, into which a small incision is previously made by hand, the cut portion 45 is led through the space 36 between the cutter 29 and the counter 35 and through the cutter and below the stop 39 and thence under the crossbar of the bail 41 and then between the rollers 8 and 27 there will be exerted a pull on the piece 45 drawing the embroidered part, say a festoon, towards the cutter 29, the latter thus separating the embroidered part from the fabric along the design. The severed portion 45, under the influence of the rotation of the cutter 29 and the pull by the rollers 8 and 27 is drawn automatically towards the band *d* of the stop 39, the guide 40 preventing the fringing of the embroidery along the cutting line. During the cutting performance the embroidery 44 is passing over the guide-arm 43 and the roller 5.

According to the embroidery that is being cut in strips to the direction of the design, there will be differences in the tension of the fabric, occasioned by the character of the design which may have raised portions, which differences are equalized by means of the bail 41, to permit to separate the parts 44 and 45 along the very line of the ornamentation or festoon without cutting or even injuring the latter.

What I claim is:

1. In a machine for cutting embroidered fabric into strips, a cylindrical and tubular cutter mounted for rotation, a support comprising a guide and a driven roll each maintained in oblique relation to the axis of the cylindrical and tubular cutter, a counter piece maintained adjacent to the edge of the cutter, a guide for the strip located within the cylindrical and tubular cutter and revoluble means for exerting tension on the strip, the axis of said means being at right angles to the axis of the cylindrical and tubular cutter.

2. In a machine for the purpose set forth, supporting means for a piece of fabric, comprising a guide-bar and a driven roll which are maintained in parallel relation to each other, a cylindrical and tubular cutter maintained at an angle to said supports, means for guiding a partially separated strip of the fabric to and through the cylindrical and tubular cutter, rotatable means beyond the cutting mechanism for exerting a pull upon the strip partially severed.

3. In a machine for the purpose set forth, a support which includes a driven roll for a piece of fabric, a cylindrical and tubular cutter maintained for rotation with its cutting edge at an angle to the edge of the fabric, a counter for the cutter over which a portion of the fabric is passed to be cut, means located to one side of the counter and within the cylindrical and tubular cutter for guiding the strip through the cutter, a tensioning device and a driven roll over which the strip is passed.

4. In a machine for the purpose set forth, a driven roll and a bar providing a support for a piece of fabric, the roll and the bar being substantially parallel, a cylindrical and tubular cutter, maintained in angular relation to the driven roll, means for rotating the cutter, a strip guiding member maintained within the cutter and tensioning means comprising a spring depressed oscillatory arm, a driven roll and a roll for engaging the strip when upon the driven roll, the tensioning means being maintained at right angles to the axis of rotation of the cylindrical and tubular cutter.

In testimony whereof I have affixed my signature in presence of two witnesses

LOUIS EGGER.

Witnesses:
O. M. AURIG,
J. H. HOLRUD.